UNITED STATES PATENT OFFICE.

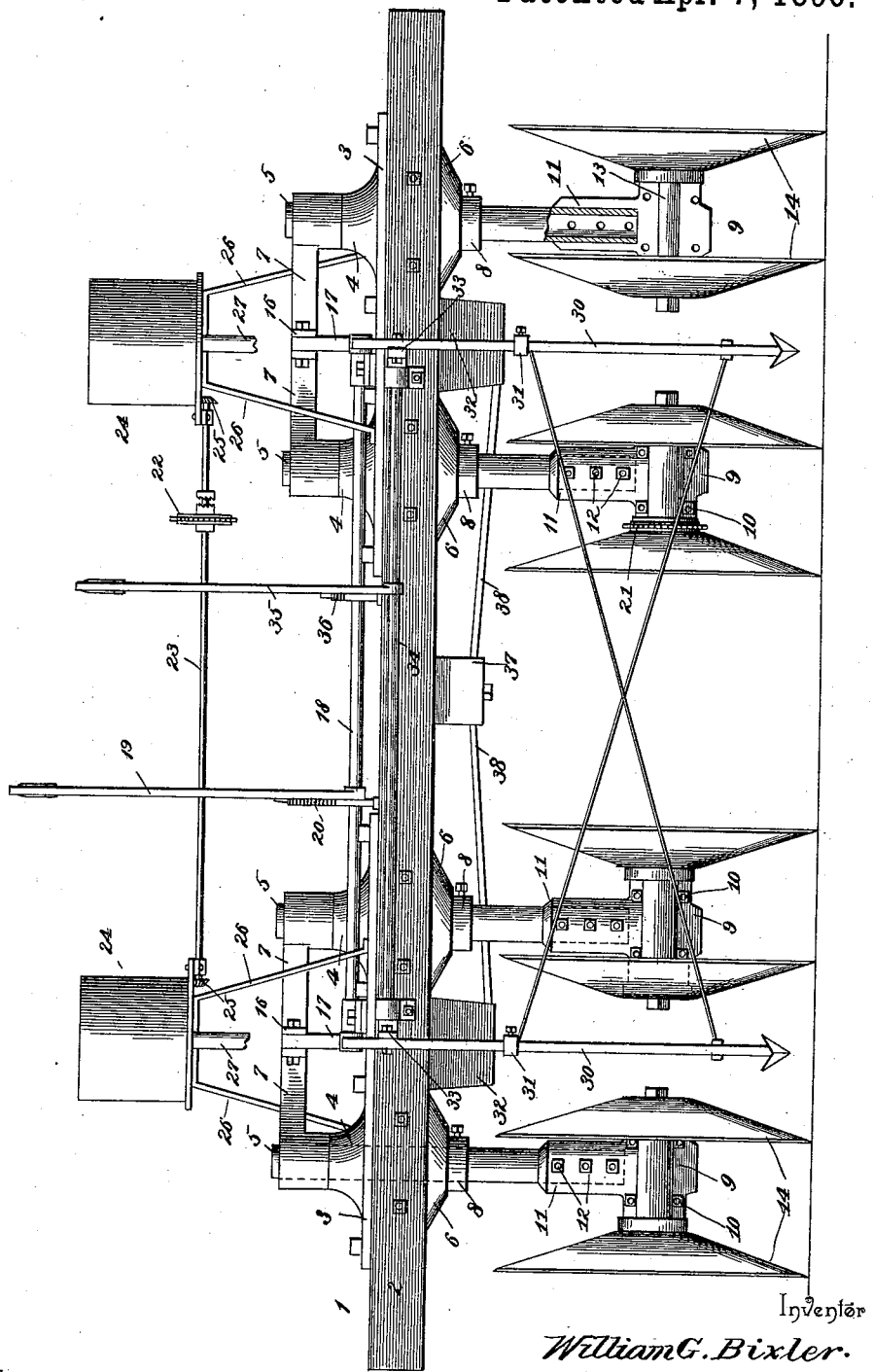

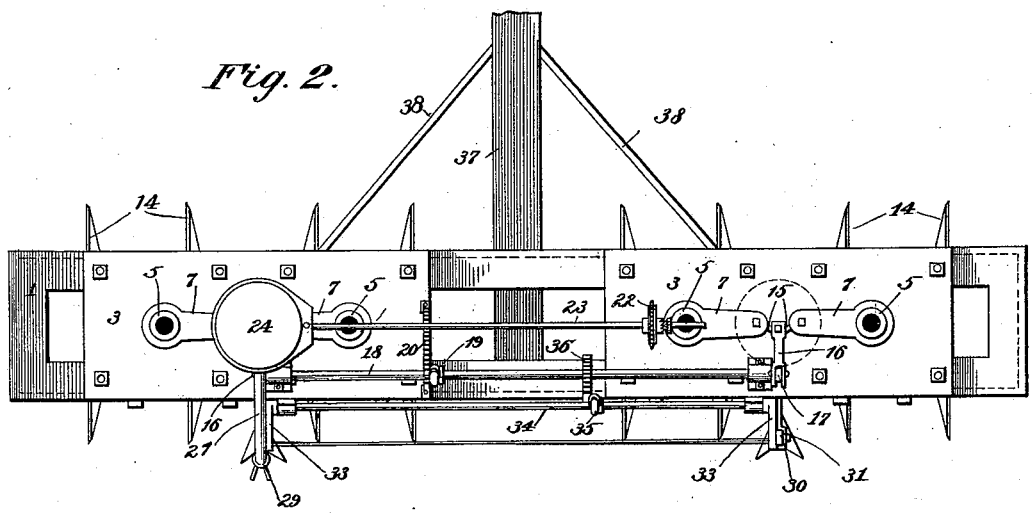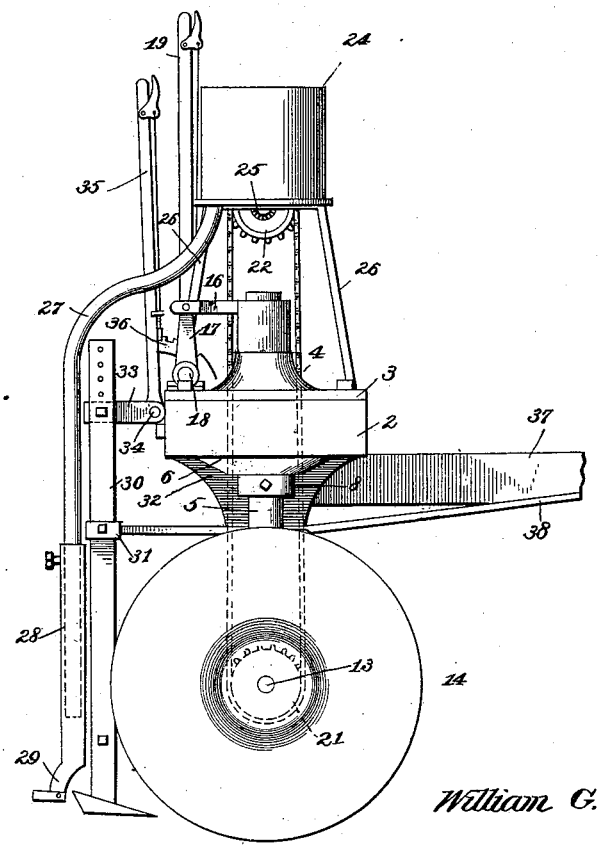

WILLIAM G. BIXLER, OF ALBION, NEBRASKA.

CORN PLANTER AND CULTIVATOR.

SPECIFICATION forming part of Letters Patent No. 557,544, dated April 7, 1896.

Application filed June 11, 1895. Serial No. 552,445. (No model.)

*To all whom it may concern:*

Be it known that I, WILLIAM G. BIXLER, a citizen of the United States, residing at Albion, in the county of Boone and State of Nebraska, have invented a new and useful Corn Planter and Cultivator, of which the following is a specification.

This invention relates to an improvement in corn planters and cultivators, and has for its object to provide a strong, simple, and efficient construction of cultivator-frame and to combine therewith novel means for adjusting and holding the cultivator-disks at any desired angle with relation to the line of draft.

A further object of the invention is to brace and support the opening-shovels or subsoilers in such manner that the draft will be applied more directly thereto, and to provide means arranged within convenient reach of the driver for adjusting the height of said shovels or lifting them entirely clear of the ground.

Other objects and advantages of the invention will appear in the course of the subjoined description.

In order to accomplish the objects above referred to, the invention consists in certain novel features and details of construction and arrangement of parts whereby certain advantages in point of simplicity and efficiency are attained, as hereinafter fully set forth, illustrated in the drawings, and finally pointed out in the claims.

In the accompanying drawings, Figure 1 is a rear elevation of a combined corn planter and cultivator constructed in accordance with this invention. Fig. 2 is a plan view of the same. Fig. 3 is a side elevation thereof.

Similar numerals of reference designate corresponding parts in the several figures of the drawings.

Referring to the accompanying drawings, 1 designates the machine-frame, which is in the form of an elongated rectangular metal plate having formed integrally therewith a depending flange 2, extending entirely around its edge, thereby forming a very stiff and light frame, which forms the support for the other parts of the machine. Secured to the upper face of such rectangular frame are two bearing-plates 3, arranged upon opposite sides of and at equal distances from the center of the machine, and said bearing-plates are formed each with a pair of upwardly-projecting bosses 4, which form the bearings for a corresponding number of vertical spindles 5, to the lower ends of which are connected the cultivator-disks.

6 indicates other bearing plates or boxes, corresponding in number to the bosses 4 and arranged beneath and secured to the lower face of the frame-plate 1.

The bearing-plates 3, as well as the plates 6, may be bolted or otherwise secured to the frame in any convenient manner.

The spindles 5, of which there are four—two at each side of the machine—are preferably formed from gas pipe or tubing and pass through vertically-alining perforations in the plates 6, bosses 4, and machine-frame, projecting at their upper ends sufficiently above their bearings to receive each a crank-arm 7, while beneath the plates 6 the spindles are each provided with a fixed collar 8, forming a vertical support for the machine-frame with relation to the spindles. The lower end of each spindle has secured thereto a bearing-box 9, which is divided vertically and composed of two sections adapted to be held together by means of bolts or other fastenings 10, each of said sections being formed with an upwardly-extending semicircular portion, said portions being adapted to embrace the lower end of a spindle and to be united thereto by means of bolts 12, which pass through the spindle and the sections of the bearing-box.

The lower portion of the box 9 extends in horizontal relation or at right angles to the socket portion 11, and is adapted to receive a horizontal spindle or shaft 13, upon each end of which is mounted a concavo-convex cultivator-disk 14 in lieu of the moldboards ordinarily employed.

The crank-arms 7 of each pair of spindles are disposed inwardly toward each other, and at their inner adjacent ends are connected by means of pivoted links 15 to a rod or pitman 16, bifurcated or forked at its rear end to stride and receive the upper swinging end of a crank-arm 17, mounted upon the end of a rock-shaft 18, extending longitudinally of the machine-frame and mounted in bearings secured to the upper face thereof. This rock-shaft is provided at each end with such a crank-arm 17 and connected with the cranks on the spindles 5 in the manner just described, whereby said spindles may all be rocked simultaneously for changing the angle of the cultivator-disks.

19 designates a hand-lever, which is rigidly affixed to the rock-shaft 18, and is provided with a thumb-latch, rod, and sliding pawl for engaging with a segmental rack 20, secured to the machine-frame, whereby the lever may be engaged at any point in its throw for holding the disks at the desired angle.

Mounted upon the hub of one of the cultivator-disks or keyed to the spindle thereof is a sprocket-wheel 21, from which a chain extends upward and passes over and around a similar sprocket 22, mounted loosely upon a horizontal shaft 23, extending longitudinally of the machine-frame and mounted at each end in bearings secured to a pair of boxes or hoppers 24. The sprocket-wheel 22 is adapted to have a slight longitudinal movement upon the shaft 23 and is formed with a clutch-faced hub adapted to engage with a clutch-faced collar secured to and revolving with said shaft. This sprocket-wheel may be moved into or out of engagement with the clutch-faced collar by any convenient means, and in this manner the shaft 23 may be thrown into and out of operation at will. A small bevel-pinion 25 is secured to each end of the shaft 23 and operates, in connection with a plate arranged in the base of each hopper 24, to open and close a feed-opening therein in a manner well understood by those familiar with the art to which this invention appertains. These hoppers are supported by means of brackets having inclined downwardly-diverging arms 26, bolted to the machine-frame.

27 represents a pipe or tube leading from each hopper 24 downwardly in rear of the machine-frame and provided at its lower end with a tubular telescopic section 28, carrying a dropping-shoe 29 at its lower end. By means of this construction the shoe 29 may be raised or lowered, as desired.

30 designates a standard arranged just in advance of each dropper-tube and carrying at its lower end a subsoiler or shovel arranged in front of the dropper-shoe and adapted to open a furrow to receive the corn or grain therefrom. This standard is mounted and adapted to slide vertically within an eye or loop 31 in the end of a rearwardly-extending bracket or brace secured to a pendent bracket 32, secured to the lower face of the main frame and projecting downwardly therefrom, as best illustrated in Fig. 3. The object of this construction and arrangement is to place the draft as near as practicable to the shovel or subsoiler.

The standard 30 at its upper end is provided with a series of perforations by means of which the same is adapted to be bolted to an arm 33, carried by a rock-shaft 34, mounted in bearings upon the machine-frame. The shaft 34 carries one of such arms 33 at each end for engaging both of the standards 30, and said shaft is adapted to be rocked by means of a hand-lever 35, which may be held at any point in its throw by means of a thumb-latch lever and pawl operating in connection with a segmental rack 36 secured to the machine-frame.

The machine is provided with the usual centrally-arranged tongue 37, from which inclined diagonal brace-rods 38 extend to and connect with the pendent bracket 32, whereby the draft is applied at a point considerably beneath the machine-frame and in horizontal alinement with the brace or arm, which supports the standard 30 at a point below its connection with the arm 33 of the rock-shaft 34.

By means of the construction above described it will be seen that the cultivator-disks may be adjusted as to their angle either in a position which will adapt them to throw the soil outward for facilitating the operation of the opening-shovel or subsoiler while being used as a corn-planter or for turning the soil inward over the furrow previously formed. This may be accomplished with facility by a simple adjustment of the lever 19. It will also be apparent that by the use of the hand-lever 35 and the rock-shaft 34 and its crank-arm the opening-shovels or subsoilers and their standards may be simultaneously adjusted to any desired height or lifted entirely clear of the ground; also that by reason of the telescopic feature of the dropping-tubes the latter may be varied in length and the shoes 29 be thereby correspondingly elevated or lowered to accord with the positions of the shovels or subsoilers. The line of draft is also disposed in a plane considerably beneath the machine-frame, thus adding materially to the efficiency of the standards 30, which carry the opening-shovels. By the arrangement described it will also be apparent that double the amount of work may be performed as compared with the ordinary corn-planter. A driver's seat may be mounted upon and secured to the machine-frame in any preferred manner.

Changes in the form, proportion, and minor details of construction may be resorted to without departing from the spirit or sacrificing any of the advantages of this invention.

Having thus described the invention, what is claimed as new, and desired to be secured by Letters Patent, is—

1. In a corn planter and cultivator, the combination with the main frame of a pair of cultivator-disks mounted upon opposite ends of a shaft or spindle, a vertically-extending revoluble spindle having a bearing in the machine-frame, and a bearing-box divided vertically or formed in two separate sections and adapted to embrace both the spindle of the cultivator-disk and the vertically-extending spindle, said box-sections being bolted or otherwise secured together and to said vertically-extending spindle, substantially in the manner and for the purpose described.

2. In a corn planter and cultivator, the combination with the main frame, of two independent sets of cultivator-disks arranged two pairs upon each side of the center of the machine, the vertically-extending spindles carrying said cultivator-disks and mounted in bearings in the machine-frame, crank-arms secured to the upper ends of said spindles, means for simultaneously vibrating said crank-arms and adjusting the angle of the disks, a horizontal shaft arranged above the machine-frame and engaging at its ends with means for operating the feeding mechanism of the hoppers or corn-boxes, and a sprocket-wheel mounted loosely upon said shaft and adapted to be thrown into or out of engagement therewith and having a chain extending around a sprocket-wheel on the hub or spindle of one of the cultivator-disks, substantially as specified.

3. In a corn planter and cultivator, a transversely-elongated main frame provided with pendent brackets secured to the lower face thereof, in combination with a pair of vertically-adjustable standards carrying subsoil-shovels at their lower ends, rearwardly-extending braces or arms secured to said brackets and provided with eyes or loops for the reception of said standards, and a rock-shaft provided with crank-arms for engaging said standards and with operating-levers, whereby said standards and their shovels are adapted to be adjusted in height or lifted clear of the ground, substantially as described.

4. In a corn planter and cultivator, the combination with the main frame, of a vertically-adjustable standard carrying a shovel at its lower end, means for adjusting the height of said standard and shovel, a tube communicating with the seed-hopper and extending downwardly in rear of said standard, and a tubular telescopic section secured to the lower end of said tube and provided at its lower end with a dropper-shoe, all arranged for joint operation and for the purpose substantially as described.

5. In a corn planter and cultivator, a transversely-elongated rectangular frame comprising a main horizontal plate and a depending flange entirely surrounding the same, in combination with a bearing-plate secured to the upper face thereof and provided with upwardly-extending bosses, a pair of vertically-extending spindles journaled in said bosses and each carrying a pair of rotary cultivator-disks at its lower end, crank-arms rigidly secured to the upper ends of said spindles and disposed inwardly toward each other, and means connected therewith for vibrating said crank-arms and simultaneously rocking the spindles and adjusting the angle of said disks, substantially as set forth.

In testimony that I claim the foregoing as my own I have hereto affixed my signature in the presence of two witnesses.

WILLIAM G. BIXLER.

Witnesses:
D. V. BLATTER,
M. B. THOMPSON.